United States Patent
Inada et al.

(10) Patent No.: US 11,958,360 B2
(45) Date of Patent: Apr. 16, 2024

(54) DISPLAY CONTROL DEVICE, DISPLAY SYSTEM, DISPLAY METHOD, AND NON-TRANSITORY STORAGE MEDIUM

(71) Applicant: TOYOTA JIDOSHA KABUSHIKI KAISHA, Aichi-ken (JP)

(72) Inventors: Tomohiro Inada, Kariya (JP); Hitoshi Muraki, Aichi-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/880,658

(22) Filed: Aug. 4, 2022

(65) Prior Publication Data
US 2023/0062934 A1 Mar. 2, 2023

(30) Foreign Application Priority Data
Aug. 31, 2021 (JP) ................ 2021-141710

(51) Int. Cl.
 *B60K 35/00* (2006.01)
 *G02B 27/01* (2006.01)
 *G02C 7/04* (2006.01)
 *G02C 11/00* (2006.01)

(52) U.S. Cl.
 CPC ........ *B60K 35/00* (2013.01); *G02B 27/0101* (2013.01); *G02C 7/04* (2013.01); *G02C 11/10* (2013.01); *B60K 2370/1529* (2019.05); *G02B 2027/014* (2013.01)

(58) Field of Classification Search
 CPC ........... B60K 35/00; B60K 2370/1529; G02B 27/0101; G02B 2027/014; G02C 7/04; G02C 11/10
 See application file for complete search history.

(56) References Cited

U.S. PATENT DOCUMENTS

| | | | |
|---|---|---|---|
| 10,083,547 B1* | 9/2018 | Tomatsu | G08G 1/09675 |
| 10,332,292 B1* | 6/2019 | Arnicar | G01C 21/3863 |
| 10,469,769 B1* | 11/2019 | Mukherjee | G06F 3/011 |
| 10,768,699 B2* | 9/2020 | Peterson | G06F 3/167 |
| 10,924,679 B2* | 2/2021 | Lee | G06V 20/56 |
| 11,639,138 B2* | 5/2023 | Shibata | B60R 1/12 345/7 |
| 2016/0097940 A1 | 4/2016 | Sako et al. | |
| 2016/0203629 A1* | 7/2016 | Takeda | G09B 29/00 345/632 |

(Continued)

FOREIGN PATENT DOCUMENTS

| | | |
|---|---|---|
| JP | 2019138773 A | 8/2019 |
| JP | 2020-091663 A | 6/2020 |
| KR | 10-1736991 B1 | 5/2017 |

*Primary Examiner* — Ibrahim A Khan
(74) *Attorney, Agent, or Firm* — HAUPTMAN HAM, LLP (57) ABSTRACT

A display control device includes a processor. The processor is configured to: determine content to be superimposed and displayed over an object on a first display unit fixed to a moving body or a second display unit worn on a human body, the object being a real image seen through the first display unit or the second display unit; select either the first display unit or the second display unit to display the content based on a predetermined condition; and superimpose and display the content over the object on the first display unit or the second display unit, the first display unit or the second display unit being selected to display the content.

15 Claims, 10 Drawing Sheets

(56) References Cited

U.S. PATENT DOCUMENTS

| | | | | |
|---|---|---|---|---|
| 2017/0076606 A1* | 3/2017 | Gupta | .................... | B60K 35/00 |
| 2017/0212633 A1* | 7/2017 | You | ........................ | B60K 37/06 |
| 2017/0322760 A1* | 11/2017 | Soh | ....................... | G06F 3/1446 |
| 2018/0270542 A1* | 9/2018 | Ramalingam | .......... | B60W 50/14 |
| 2019/0079717 A1* | 3/2019 | Lee | ........................ | B60K 37/06 |
| 2019/0121522 A1* | 4/2019 | Davis | ..................... | G06V 40/28 |
| 2019/0248287 A1 | 8/2019 | Ono et al. | | |
| 2019/0333396 A1* | 10/2019 | Robinson | ............. | G02B 27/017 |
| 2019/0333404 A1* | 10/2019 | Bicanic | ................... | G09B 9/24 |
| 2020/0081525 A1* | 3/2020 | Peterson | ................ | G06F 3/167 |
| 2020/0126276 A1* | 4/2020 | Rakshit | ................... | G10L 25/84 |
| 2020/0137665 A1* | 4/2020 | Judi | ...................... | H04W 12/63 |
| 2020/0159481 A1* | 5/2020 | You | ........................ | G06F 3/1423 |
| 2020/0180519 A1 | 6/2020 | Mori | | |
| 2020/0247412 A1* | 8/2020 | Wang | .................... | B60W 50/14 |
| 2021/0049925 A1* | 2/2021 | Robinson | ............. | G06T 19/006 |
| 2021/0162927 A1* | 6/2021 | Takii | ....................... | H04N 7/18 |
| 2021/0300259 A1* | 9/2021 | Shibata | ................... | B60R 1/00 |

\* cited by examiner

DISPLAY CONTROL DEVICE, DISPLAY SYSTEM, DISPLAY METHOD, AND NON-TRANSITORY STORAGE MEDIUM

CROSS-REFERENCE TO RELATED APPLICATION

This application claims priority to Japanese Patent Application No. 2021-141710 filed on Aug. 31, 2021, incorporated herein by reference in its entirety.

BACKGROUND

1. Technical Field

The present disclosure relates to display control devices, display systems, display methods, and non-transitory storage media.

2. Description of Related Art

Japanese Unexamined Patent Application Publication No. 2019-138773 (JP 2019-138773 A) discloses an augmented reality head-up display (AR-HUD) that superimposes an image on a windshield, and US Patent Application Publication No. 2016/0097940 discloses a smart contact lens that is a contact lens with a display unit.

SUMMARY

When an HUD or a contact lens is used as an AR display, the HUD has a limited viewing angle, and the contact lens does not provide sufficient display accuracy.

The present disclosure provides a display control device, a display system, a display method, and a non-transitory storage medium in which different display units complement each other's features to provide display that is easy for the user to visually recognize.

A display control device according to a first aspect of the present disclosure includes a processor. The processor is configured to: determine content to be superimposed and displayed over an object on a first display unit fixed to a moving body or a second display unit worn on a human body, the object being a real image seen through the first display unit or the second display unit; select either the first display unit or the second display unit to display the content based on a predetermined condition; and superimpose and display the content over the object on the first display unit or the second display unit, the first display unit or the second display unit being selected to display the content.

In the display control device according to the first aspect of the present disclosure, the processor is configured to display the content on the first display unit or the second display unit. The first display unit may be fixed to the moving body such as vehicle, and the second display unit may be worn on the human body such as head or eye. In this display control device, the processor selects the display unit to display the content based on the predetermined condition, and superimposes and displays the content over the object, the object being the real image seen through the selected display unit. According to this display control device, the different display units complement each other's features to provide display that is easy for a user to visually recognize.

In the display control device according to the first aspect of the present disclosure, the processor may be configured to select either the first display unit or the second display unit to display the content based on at least one of conditions regarding the object over which the content is to be superimposed and displayed, a distance from the moving body to the object, and a display position of the content with respect to a viewing angle of each of the first display unit and the second display unit.

The display control device according to the first aspect of the present disclosure can thus select the display unit suitable for each condition.

In the display control device according to the first aspect of the present disclosure, the processor may be configured to display the content on the second display unit when a display position of the content is located outside a display area of the first display unit.

According to the display control device according to the first aspect of the present disclosure, the second display unit can thus display the content whose display position is located outside the display area of the first display unit.

In the display control device according to the first aspect of the present disclosure, the processor may be configured to display the content on the second display unit when a distance from the moving body to the object is greater than a predetermined value.

According to the display control device according to the first aspect of the present disclosure, the second display unit can display the content even when the viewpoint distance to the content is not suitable for a distant object over which the content is to be superimposed and displayed on the first display unit.

A display system according to a second aspect of the present disclosure may include: the display control device; a head-up display that is the first display unit mounted on a vehicle that is the moving body; and a smart contact lens included in the second display unit worn on an eye of an occupant of the vehicle.

The display system according to the second aspect of the present disclosure uses the different display units with different features in the vehicle depending on the condition and thus provides display that is easy for the occupant to visually recognize.

A display method according to a third aspect of the present disclosure includes: a first step of determining content to be superimposed and displayed over an object on a first display unit fixed to a moving body or a second display unit worn on a human body, the object being a real image seen through the first display unit or the second display unit; a second step of selecting either the first display unit or the second display unit to display the content based on a predetermined condition; and a third step of superimposing and displaying the content over the object on the first display unit or the second display unit, the first display unit or the second display unit being selected to display the content. The first step, the second step and the third step are performed by a computer.

In the display method according to the third aspect of the present disclosure, the computer is configured to display the content on the first display unit or the second display unit. The forms of the first display unit and the second display unit are as described above. In this display method, the computer selects the display unit to display the content based on the predetermined condition, and superimposes and displays the content over the real image seen through the selected display unit. According to this display method, the different display units complement each other's features to provide display that is easy for a user to visually recognize.

A non-transitory storage medium according to a fourth aspect of the present disclosure stores instructions that are executable by one or more processors and that cause the one or more processors to perform functions. The functions include: determining content to be superimposed and displayed over an object on a first display unit fixed to a moving body or a second display unit worn on a human body, the object being a real image seen through the first display unit or the second display unit; selecting either the first display unit or the second display unit to display the content based on a predetermined condition; and superimposing and displaying the content over the object on the first display unit or the second display unit, the first display unit or the second display unit being selected to display the content.

The non-transitory storage medium according to the fourth aspect of the present disclosure stores the instructions that cause the processor(s) to perform the function to display the content on the first display unit or the second display unit. The forms of the first display unit and the second display unit are as described above. This non-transitory storage medium stores the instructions that cause the processor(s) to perform the function to select the display unit to display the content based on the predetermined condition and the function to superimpose and display the content over the real image seen through the selected display unit. According to this non-transitory storage medium, the different display units complement each other's features to provide display that is easy for a user to visually recognize.

According to the present disclosure, the different display units complement each other's features to provide display that is easy for a user to visually recognize.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, display systems 10 according to embodiments of the present disclosure will be described with reference to the drawings.

First Embodiment

Overall Configuration

Figure 1:
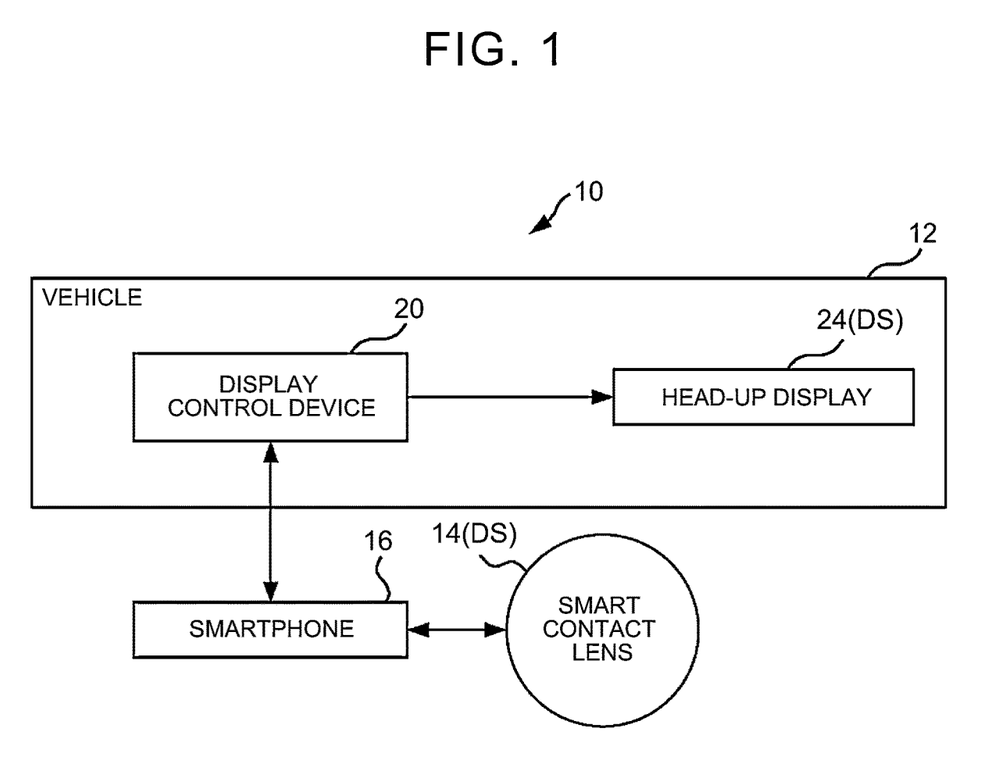
FIG. 1 shows a schematic configuration of a display system according to a first embodiment.

As shown in FIG. 1, a display system 10 of a first embodiment includes a display control device 20, a head-up display 24, a smart contact lens 14, and a smartphone 16. The head-up display 24 and the smart contact lens 14 are provided as display units DS that provide display related to various functions of a vehicle 12 to an occupant of the vehicle 12. The head-up display 24 and the smart contact lens 14 of the present embodiment can display content such as images and text superimposed over the environment outside the vehicle 12 by using augmented reality (AR) technology. The head-up display 24 is an example of the first display unit, and the smart contact lens 14 is an example of the second display unit.

Figure 8:
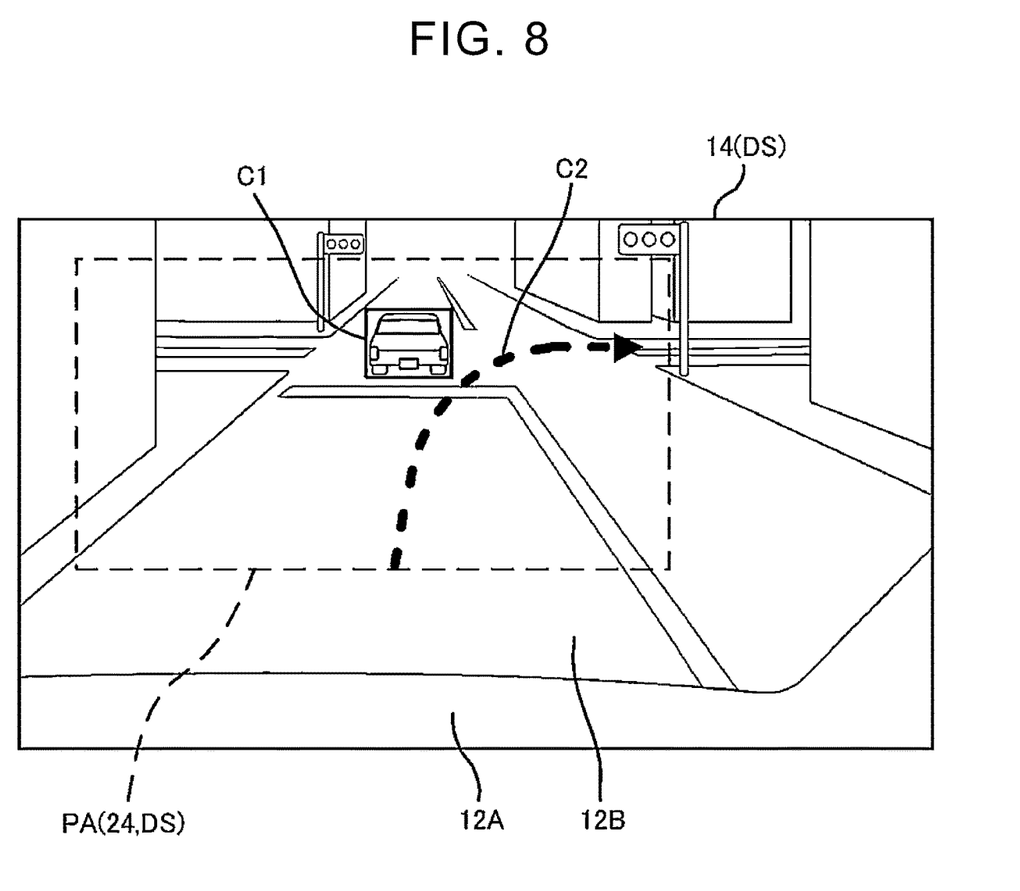
FIG. 8 illustrates display on a head-up display in the first embodiment.
Figure 9:
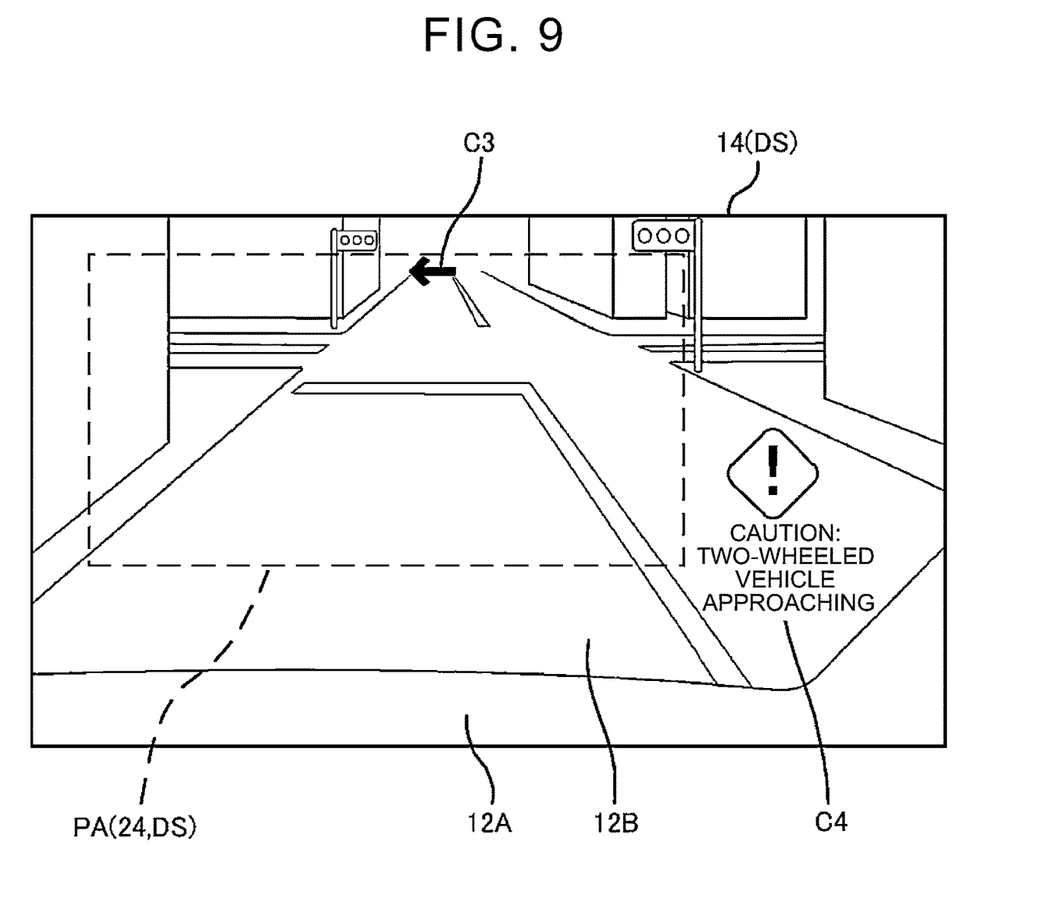
FIG. 9 illustrates display on the smart contact lens in the first embodiment.

Main configurations of the display control device 20 and the head-up display 24 are housed inside a dashboard 12A (see FIGS. 8 and 9). The smart contact lens 14 is worn on an eye of the occupant. The smartphone 16 is carried by the occupant.

The head-up display 24 is electrically connected to the display control device 20. The smart contact lens 14 is connected to the display control device 20 via the smartphone 16 so that the smart contact lens 14 can communicate with the display control device 20 via the smartphone 16. The present disclosure is not limited to this form, and the smart contact lens 14 may directly communicate with the display control device 20 without via the smartphone 16.

Vehicle

Figure 2:
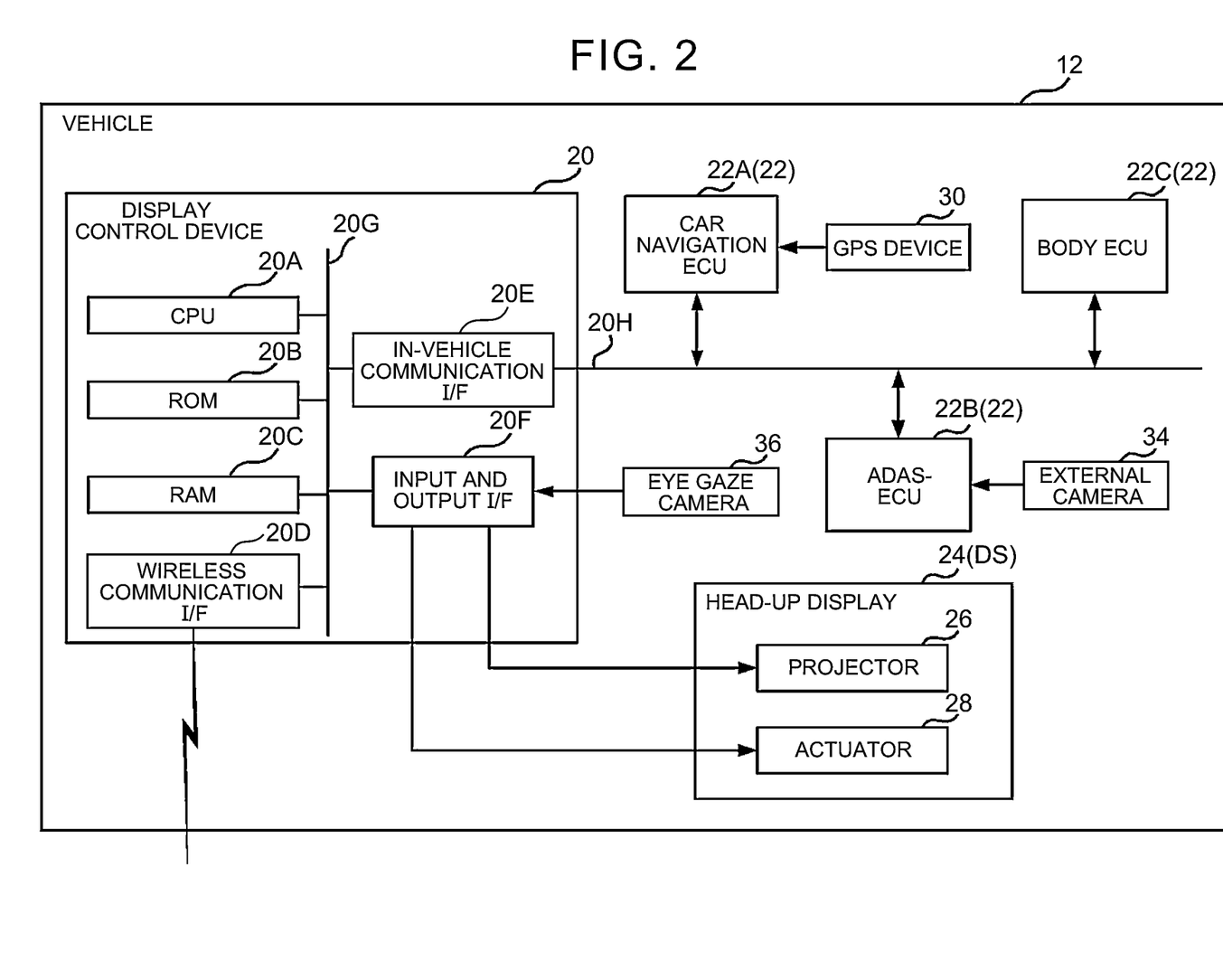
FIG. 2 is a block diagram showing a hardware configuration of a vehicle of the first embodiment.

As shown in FIG. 2, the vehicle 12 includes at least the display control device 20, electronic control units (ECUs) 22, and the head-up display 24. The vehicle 12 is equipped with a Global Positioning System (GPS) device 30, an external camera 34, and an eye gaze camera 36.

The ECUs 22 include a car navigation ECU 22A, an Advanced Driver Assistance System (ADAS)-ECU 22B, and a body ECU 22C.

The car navigation ECU 22A controls a car navigation system. The GPS device 30 is connected to the car navigation ECU 22A. The GPS device 30 is a device that measures the current position of the vehicle 12. The GPS device 30 includes an antenna, not shown, that receives signals from a GPS satellite. The GPS device 30 may be directly connected to the display control device 20.

The ADAS-ECU 22B supervises and controls an Advanced Driver Assistance System (ADAS). The external camera 34 is connected to the ADAS-ECU 22B. The external camera 34 is an external sensor that captures an image of at least the area ahead of the vehicle 12. In addition to the external camera 34, sensors such as millimeter wave radar and Laser Imaging Detection and Ranging (LiDAR) are connected to the ADAS-ECU 22B as a sensor group to be used to detect the surroundings of the vehicle 12. The millimeter wave radar sends millimeter waves and receives reflected waves, and the LiDAR scans the road ahead of the vehicle 12. Actuators, not shown, that drive a brake and an accelerator are also connected to the ADAS-ECU 22B. The external camera 34 may be directly connected to the display control device 20.

The body ECU 22C controls wipers and lights. For example, switches for headlights and turn signals are connected to the body ECU 22C.

The head-up display 24 includes a projector 26 and an actuator 28. The actuator 28 is a drive device for adjusting the angle of a mirror that reflects an image projected from the projector 26 and the distance between the mirror and the projector 26.

The eye gaze camera 36 is a camera capturing an image of at least the face of the occupant. The eye gaze camera 36 detects the eye gaze of the occupant. The eye gaze camera 36 is connected to an input and output interface (I/F) 20F that will be described later.

The head-up display 24 has a projection plane PA in a predetermined area on a windshield 12B (see FIGS. 8 and 9), and an image projected from the projector 26 is displayed on the projection plane PA. The projection plane PA can be regarded as a display area of the head-up display 24. The projection plane of the head-up display 24 is not limited to the windshield 12B, and a combiner (reflector) installed on the dashboard 12A may be the projection plane.

The display control device 20 of the present embodiment sets the position of the content to be displayed on the head-up display 24 based on the images captured by the external camera 34. At this time, the display control device 20 acquires three-dimensional coordinates of the occupant's eye-point based on the image from the eye gaze camera 36, and corrects the image capturing position to the occupant's eye-point based on the acquired three-dimensional coordinates. The head-up display 24 can thus superimpose and display the content over an object over which the content is to be displayed, namely over a real image. The display control device 20 may position the road on which the vehicle 12 is running, other vehicle(s), and a pedestrian(s) in a virtual space based on the images captured by the external camera 34, and may set the position of the content over an object in the virtual space. In this case as well, the head-up display 24 can superimpose and display the content over the object over which the content is to be displayed, namely over a real image.

The display control device 20 includes a central processing unit (CPU) 20A, a read-only memory (ROM) 20B, a random access memory (RAM) 20C, a wireless communication interface (I/F) 20D, an in-vehicle communication I/F 20E, and the input and output I/F 20F. The CPU 20A, the ROM 20B, the RAM 20C, the wireless communication I/F 20D, the in-vehicle communication I/F 20E, and the input and output I/F 20F are connected to each other via an internal bus 20G so that they can communicate with each other via the internal bus 20G.

The CPU 20A is a central processing unit that executes various programs and controls various units. That is, the CPU 20A reads a program from the ROM 20B and executes the program using the RAM 20C as a work area. The CPU 20A can be regarded as the processor of the present disclosure.

Figure 3:
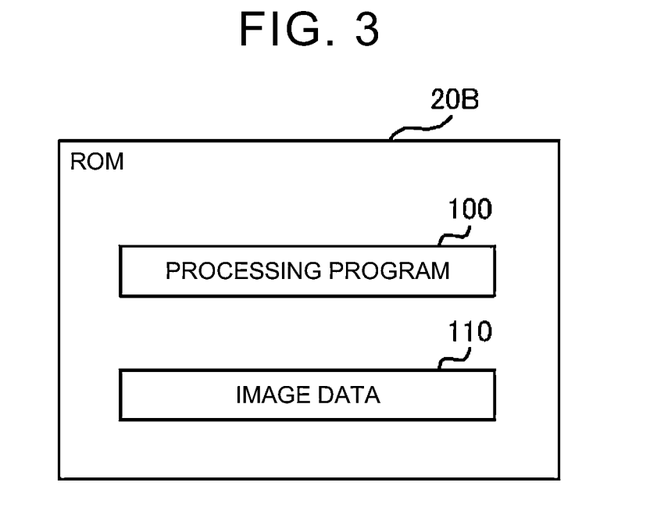
FIG. 3 is a block diagram showing a configuration of a read-only memory (ROM) in a display control device of the first embodiment.

The ROM 20B stores various programs and various kinds of data. As shown in FIG. 3, the ROM 20B of the present embodiment stores a processing program 100 and image data 110. The processing program 100 and the image data 110 may be stored in a storage such as hard disk drive (HDD) or solid state drive (SSD).

The processing program 100 that is a display program is a program for performing a display process and a selection process that will be described later. The image data 110 is data storing content that is images to be displayed on the head-up display 24.

As shown in FIG. 2, the RAM 20C serves as a work area to temporarily store a program or data.

The wireless communication I/F 20D is an interface for connecting to the smartphone 16 or smart glasses 18 that will be described later. A communication standard such as Bluetooth (registered trademark) or Wi-Fi (registered trademark) is used for the wireless communication I/F 20D.

The in-vehicle communication I/F 20E is an interface for connecting to each ECU 22. A communication standard based on Controller Area Network (CAN) protocol is used for the in-vehicle communication I/F 20E. The in-vehicle communication I/F 20E is connected to each ECU 22 via an external bus 20H.

The input and output I/F 20F is an interface for communicating with the projector 26 and the actuator 28 of the head-up display 24.

Figure 4:
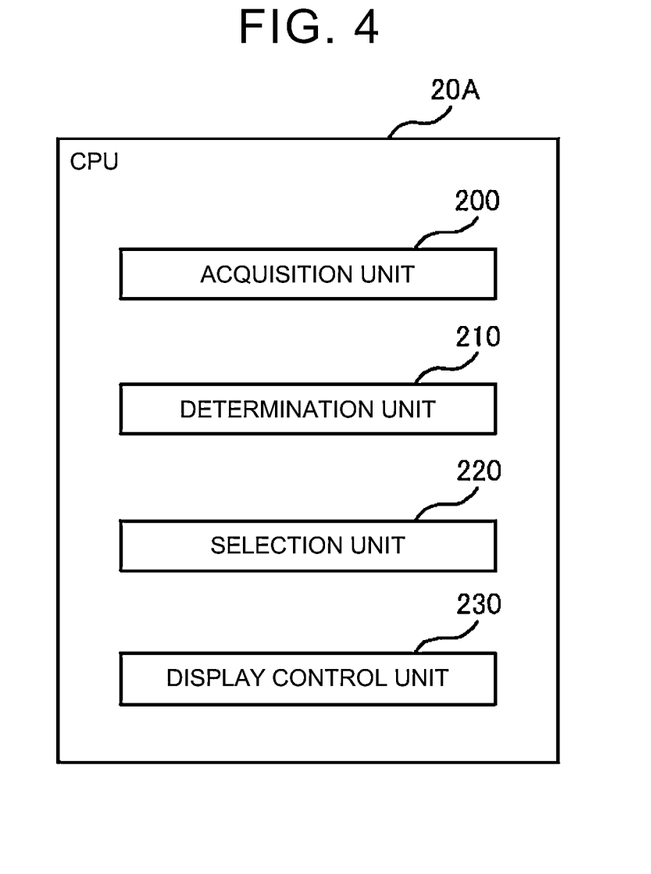
FIG. 4 is a block diagram showing functional configurations of a central processing unit (CPU) in the display control device of the first embodiment.

As shown in FIG. 4, the CPU 20A of the display control device 20 of the present embodiment functions as an acquisition unit 200, a determination unit 210, a selection unit 220, and a display control unit 230 by executing the processing program 100.

The acquisition unit 200 has a function to acquire captured images for the vehicle 12, vehicle information related to control of the vehicle 12, etc. For example, the acquisition unit 200 acquires images captured by the external camera 34 and the eye gaze camera 36. For example, the acquisition unit 200 acquires a route to the destination from the car navigation ECU 22A. For example, the acquisition unit 200 acquires the speed, acceleration, yaw rate, etc. of the vehicle 12 from the ADAS-ECU 22B.

The determination unit 210 has a function to determine the content to be displayed on the head-up display 24 and the smart contact lens 14. For example, the determination unit 210 determines an image in the image data 110 such as arrow to be used for car navigation to be the content. For example, the determination unit 210 determines an image of a number corresponding to the vehicle speed to be the content.

The selection unit 220 has a function to select the display unit DS to display the content determined by the determination unit 210 from the head-up display 24 and the smart contact lens 14 based on a predetermined condition. The selection unit 220 selects the display unit DS for each piece of content to be displayed from the head-up display 24 and the smart contact lens 14 by performing the selection process that will be described later.

The display control unit 230 has a function to display the content on the display unit DS selected by the selection unit 220.

Smart Contact Lens

Figure 5:
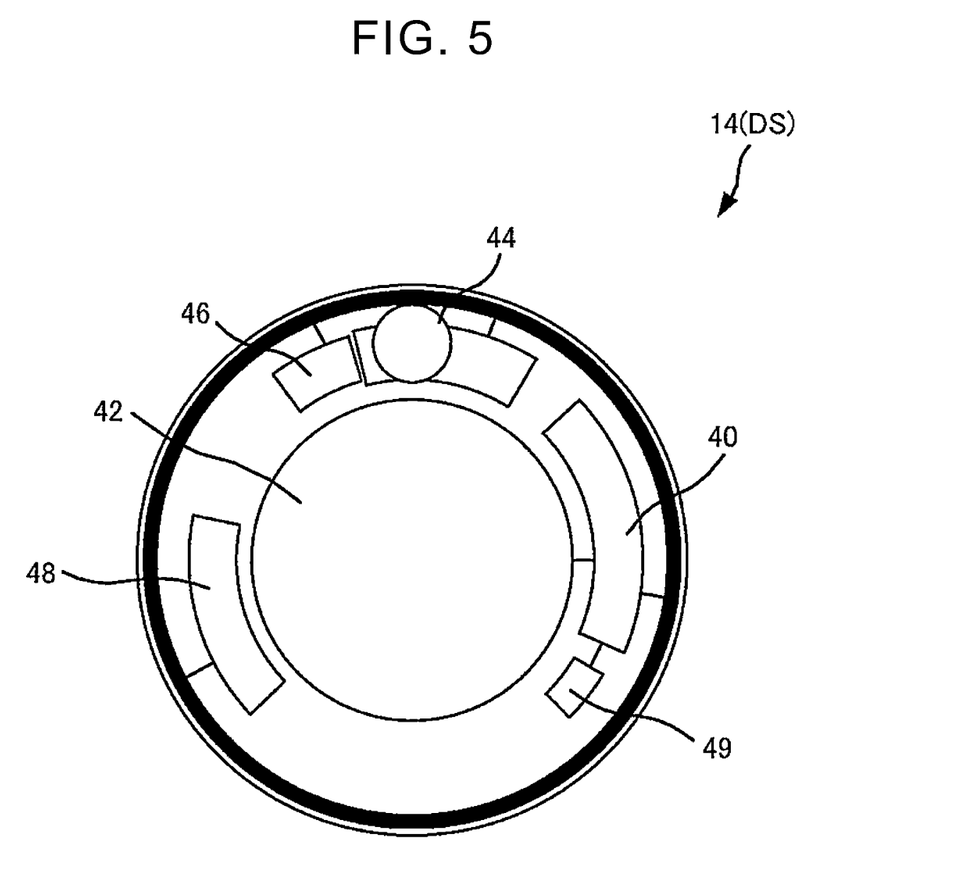
FIG. 5 shows a hardware configuration of a smart contact lens according to the first embodiment.

The smart contact lens 14 is a wearable device that is worn on an eye of the occupant of the vehicle 12 to display an image to the eye. As shown in FIG. 5, the smart contact lens 14 includes a control unit 40, a display unit portion 42, a camera unit 44, a power supply unit 46, a communication unit 48, and a sensor 49.

The control unit 40 controls the display unit portion 42, the camera unit 44, the power supply unit 46, the communication unit 48, and the sensor 49 of the smart contact lens 14. The control unit 40 is configured as a microcomputer having a CPU, a ROM, and a RAM.

The display unit portion 42 functions as a display unit that displays content such as images and texts to be presented to the occupant of the vehicle 12. The display unit portion 42 of the present embodiment includes a plurality of light-emitting elements that generates an image. The display unit portion 42 uses, for example, a method in which the display unit portion 42 projects an image onto the retina using a combination of light-emitting diodes (LEDs) as the light-emitting elements and a microlens or a method using holographic optical elements as the light-emitting elements, and functions as a device that is less susceptible to the viewpoint distance. The display unit portion 42 of the present embodiment includes a plurality of light receiving elements for detecting the eye gaze. The light receiving elements receive light reflected from the surface of an eyeball of the occupant.

The camera unit 44 functions as an imaging unit that captures an image of the environment outside the eye. The camera unit 44 includes an imaging lens and a drive unit that drives the imaging lens.

The power supply unit 46 is a drive source that drives the control unit 40, the display unit portion 42, the camera unit 44, the communication unit 48, and the sensor 49. The smart contact lens 14 may not include the power supply unit 46, and may be powered wirelessly.

The communication unit 48 functions as a communication unit that communicates with the external smartphone 16 or the external display control device 20. For example, a short-range wireless communication standard such as Bluetooth (registered trademark) is used for the communication unit 48. The communication unit 48 receives data of the content to be displayed on the display unit portion 42. The communication unit 48 sends data of an image captured by the camera unit 44 and data acquired by the sensor 49 that will be described later. The communication unit 48 of the present embodiment is connected to the display control device 20 via the smartphone 16. However, the present disclosure is not limited to this, and the communication unit 48 may be directly connected to the display control device 20.

The sensor 49 measures the electrical resistance of tear fluid in the occupant's eye. Measuring the electrical resistance value of the tear fluid allows the display control device 20 to measure the amount of tear fluid.

The smart contact lens 14 of the present embodiment sets the display position of the content on the display unit portion 42 based on the image captured by the camera unit 44. The smart contact lens 14 can thus superimpose and display the content over an object over which the content is to be displayed, namely over a real image.

Smartphone

The smartphone 16 is a communication terminal carried by the occupant. The smartphone 16 is connected to both the smart contact lens 14 and the display control device 20 by wireless communication.

Control Flow

The flow of the display process and the selection process that are a display method to be performed by the display control device 20 of the present embodiment will be described with reference to FIGS. 6 and 7. The display process and the selection process are performed by the CPU 20A functioning as the acquisition unit 200, the determination unit 210, the selection unit 220, and the display control unit 230.

Figure 6:
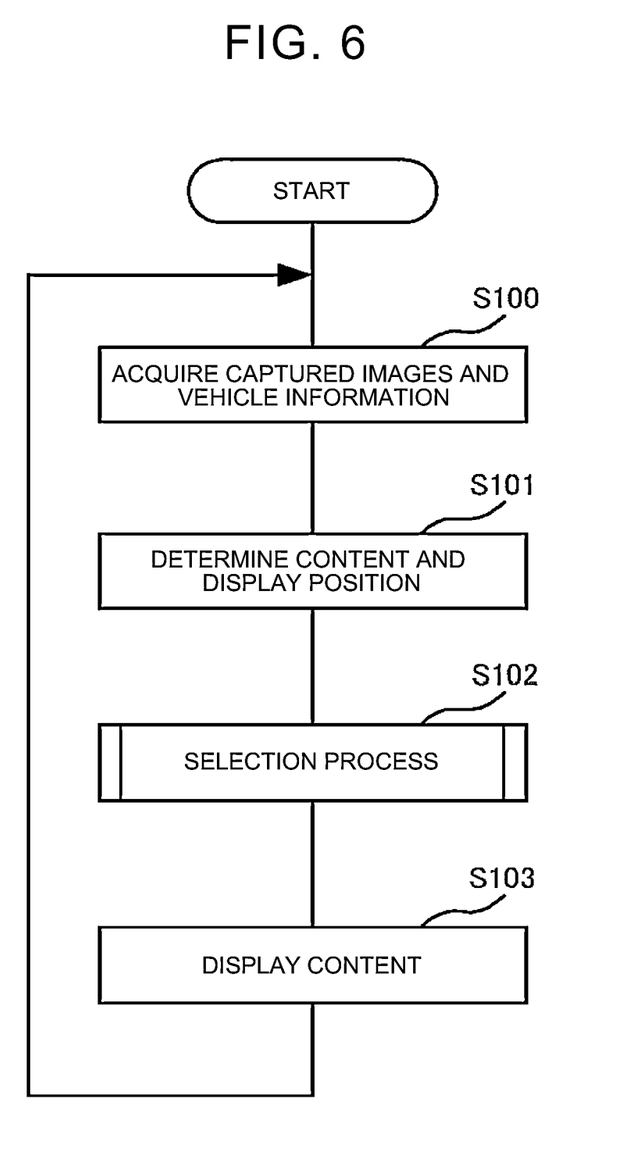
FIG. 6 is a flowchart showing the flow of a display process in the first embodiment.
Figure 7:
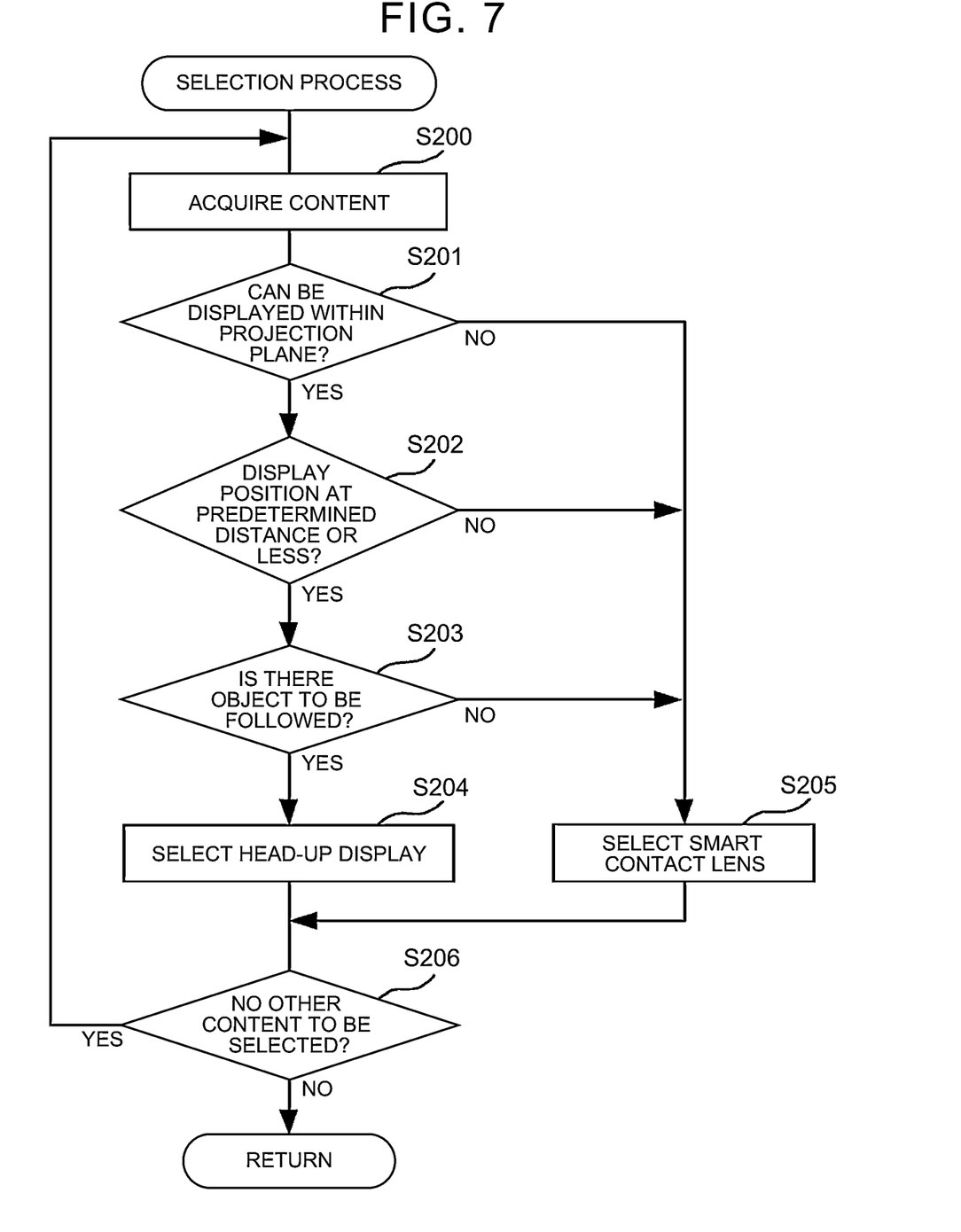
FIG. 7 is a flowchart showing the flow of a selection process in the first embodiment.

In step S100 of FIG. 6, the CPU 20A acquires captured images from each camera and acquires vehicle information from each ECU 22. For example, the CPU 20A acquires a route to the destination of the vehicle 12 and the speed, acceleration, yaw rate, etc. of the vehicle 12 as the vehicle information.

In step S101, the CPU 20A determines the content to be displayed on each display unit DS and the display position of the content.

In step S102, the CPU 20A performs the selection process. The selection process will be described in detail later.

In step S103, the CPU 20A displays the content on the selected display unit DS. The routine then returns to step S100.

Specifically, when displaying the content on the head-up display 24, the CPU 20A outputs image information of the content to the projector 26. The content is thus superimposed and displayed over a real image seen through the windshield 12B at the occupant's viewpoint on the projection plane PA.

For example, as shown in FIG. 8, a bounding box C1 is superimposed and displayed over a vehicle ahead that is an object over which the content is to be displayed. The bounding box C1 is the content indicating that the Advanced Driver Assistance System is detecting the vehicle ahead. For example, a line C2 is superimposed and displayed over the road that is an object over which the content is to be displayed. The line C2 is the content indicating the path for the vehicle 12.

When displaying the content on the smart contact lens 14, the CPU 20A outputs image information and position information of the content to the smart contact lens 14 via the smartphone 16. In the smart contact lens 14, the control unit 40 thus controls the display unit portion 42 to superimpose and display the content over the real image seen through the display unit portion 42. For example, as shown in FIG. 9, an arrow C3 is superimposed and displayed over the road ahead that is an object over which the content is to be displayed. The arrow C3 is the content indicating the path to be followed by the vehicle 12. For example, a warning indication C4 is also superimposed and displayed on the right side of the vehicle 12 that is an area (an object) over which the content is to be displayed. The warning indication C4 is the content indicating that a two-wheeled vehicle is approaching from behind on the right.

Next, the selection process of step S102 will be described with reference to FIG. 7. In step S200 of FIG. 7, the CPU 20A acquires the content determined to be displayed in step S101.

In step S201, the CPU 20A determines whether the content is displayed within the projection plane PA, that is, within the display area of the head-up display 24. In other words, the CPU 20A determines whether the display of the content fits within the viewing angle of the head-up display 24. When the CPU 20A determines that the content is displayed within the projection plane PA (YES in step S201), the routine proceeds to step S202. On the other hand, when the CPU 20A determines that the content is not displayed within the projection plane PA (NO in step S201), the routine proceeds to step S205.

In step S202, the CPU 20A determines whether the display position of the content is at a predetermined distance or less from the vehicle 12. As used herein, the distance from the vehicle 12 refers to the distance to the virtual position where the virtual image of the content is displayed. For example, in FIG. 8, the bounding box C1 is superimposed and displayed over the real image of the vehicle ahead on the projection plane PA. In this case, the virtual position where the virtual image of the bounding box C1 is displayed is the position of the vehicle ahead. When the CPU 20A determines that the display position of the content is at the predetermined distance or less from the vehicle 12 (YES in step S202), the routine proceeds to step S203. On the other hand, when the CPU 20A determines that the display position of the content is not at the predetermined distance or less from the vehicle 12, that is, the display position of the content is at more than the predetermined distance from the vehicle 12 (NO in step S202), the routine proceeds to step S205.

In step S203, the CPU 20A determines whether there is an object to be followed by the content. As used herein, an object to be followed by the content refers to an object that the content is caused to follow when superimposed and displayed over the object, such as a vehicle, a pedestrian, a road, or other structure. When the CPU 20A determines that there is an object to be followed by the content (YES in step S203), the routine proceeds to step S204. On the other hand, when the CPU 20A determines that there is no object to be followed by the content (NO in step S203), the routine proceeds to step S205.

In step S204, the CPU 20A selects to display the content on the heads-up display 24. The routine then proceeds to step S206.

In step S205, the CPU 20A selects to display the content on the smart contact lens 14. The routine then proceeds to step S206.

In step S206, the CPU 20A determines whether there is no other content to be selected. When the CPU 20A determines that there is no other content to be selected (NO in step S206), the CPU 20A ends the selection process. On the other hand, when the CPU 20A determines that there is other content to be selected (YES in step S206), the routine returns to step S200.

Summary

In the display control device 20 of the present embodiment, the CPU 20A is configured to display content on each of the head-up display 24 that is the first display unit and the smart contact lens 14 that is the second display unit. The head-up display 24 is fixedly mounted on the vehicle 12, and the smart contact lens 14 is worn on an eye of the occupant. In the present embodiment, the CPU 20A selects, based on the predetermined condition, the display unit DS to display the content, and superimposes and displays the content over the real image seen through the selected display unit DS. According to the display control device 20 of the present embodiment, the different display units DS complement each other's features to provide display that is easy for the user to visually recognize.

More specifically, the head-up display 24 is superior to the smart contact lens 14 in the accuracy of the display position when the content is superimposed over the real image. On the other hand, the smart contact lens 14 of the present embodiment projects the content directly onto the retina etc. Therefore, the smart contact lens 14 is less likely to make the user feel uncomfortable like the head-up display 24 does when the viewpoint distance to the content is large. In the present embodiment, the CPU 20A selects the display unit DS to display the content based on at least one of the following conditions: an object over which the content is to be superimposed and displayed, the distance from the vehicle 12 to the object over which the content is to be displayed, and the display position of the content with respect to the viewing angle of each display unit DS.

In particular, when the object over which the content is to be superimposed and displayed is a vehicle, a pedestrian, a road, other structure, etc., the display control device 20 of the present embodiment selects the head-up display 24 having higher positioning accuracy.

When the display position of the content is located outside the viewing angle of the head-up display 24, that is, outside the display area of the head-up display 24, the display control device 20 of the present embodiment displays the content on the smart contact lens 14 having a less limited viewing angle. According to the present embodiment, the smart contact lens 14 can thus display the content whose display position is located outside the display area of the head-up display 24.

In the display control device 20 of the present embodiment, when the distance from the vehicle 12 to an object over which the content is to be displayed is greater than the predetermined value, the content is displayed on the smart contact lens 14 that is less susceptible to the viewpoint distance. According to the present embodiment, the smart contact lens 14 can thus display the content even when the viewpoint distance to the content is not suitable for a distant object over which the content is to be displayed on the head-up display 24.

Second Embodiment

The display system 10 of the first embodiment includes the head-up display 24 and the smart contact lens 14 as the display units DS, and selects the display unit DS to display the content. On the other hand, the display system 10 of a second embodiment includes smart glasses 18 as a display unit DS in addition to the head-up display 24 and the smart contact lens 14, selects the display unit DS to display the content. Hereinafter, differences from the first embodiment will be described. The same configurations as those of the first embodiment are denoted by the same signs as those of the first embodiment, and detailed description thereof will be omitted.

Figure 10:
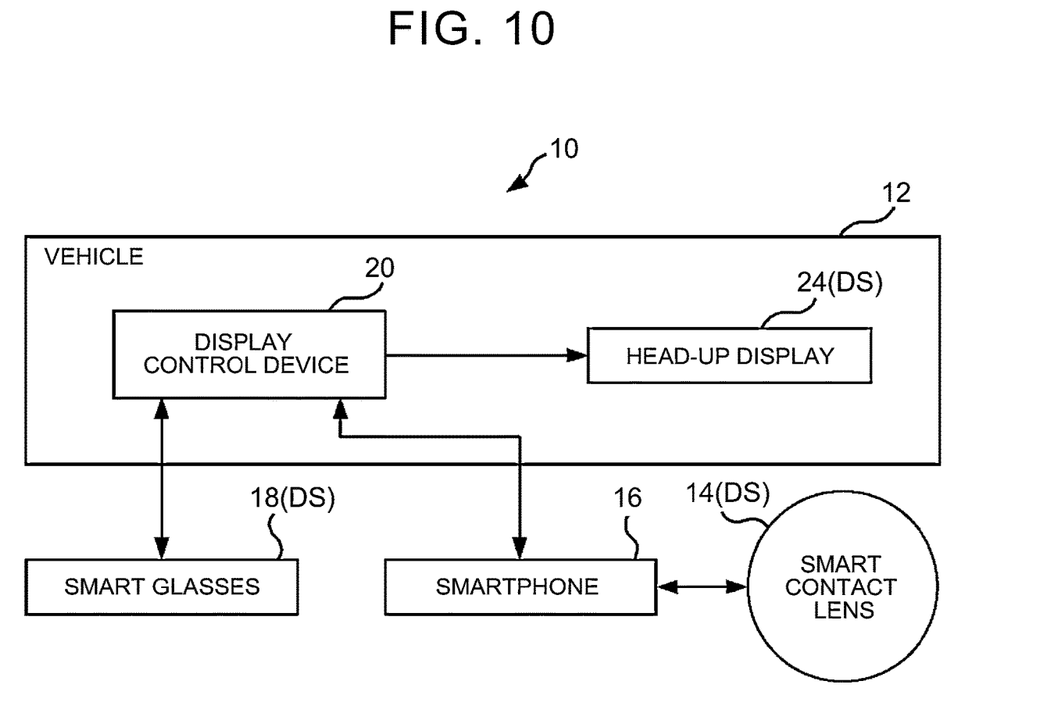
FIG. 10 shows a schematic configuration of a display system according to a second embodiment.

As shown in FIG. 10, in addition to the smartphone 16, smart glasses 18 are connected to the display control device 20 of the present embodiment so that the smart glasses 18 can communicate with the display control device 20. The smart glasses 18 are worn on the head of the occupant. The smart glasses 18 are an example of the second display unit.

Smart Glasses

The smart glasses 18 are a head-mounted display type wearable device that superimposes and displays content such as images and texts over the environment outside the vehicle 12 using the AR technology. The smart glasses 18 are a device that is worn by the occupant of the vehicle 12. Although not shown in the figure, the smart glasses 18 include at least a camera that captures images inside and outside the vehicle cabin, a transmissive display, and a communication device that communicates with the display control device 20.

Control Flow

The selection process of the present embodiment will be described with reference to FIG. 11.

Figure 11:
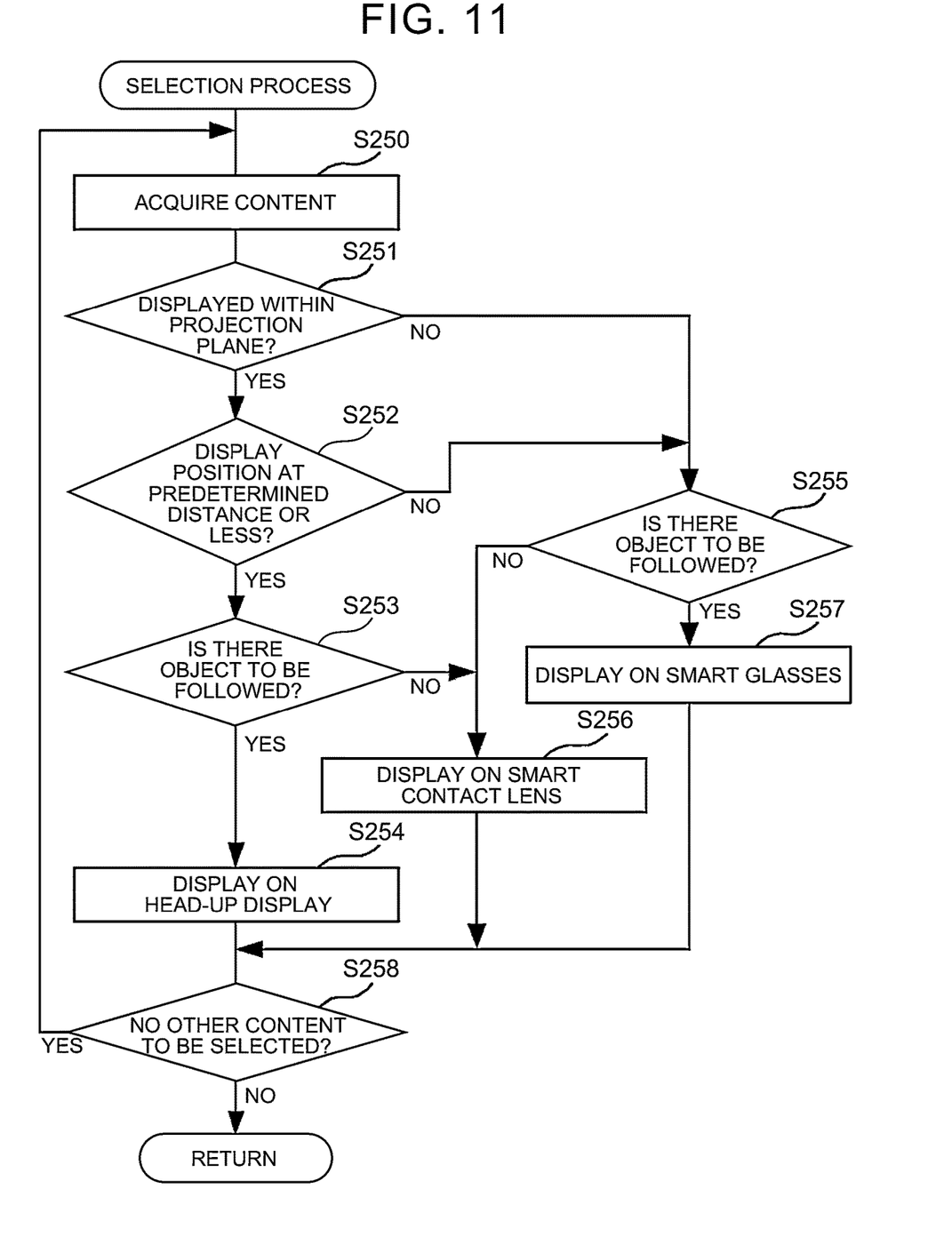
FIG. 11 is a flowchart showing the flow of a selection process in the second embodiment.

In step S250 of FIG. 11, the CPU 20A acquires the content determined to be displayed in step S101.

In step S251, the CPU 20A determines whether the content is displayed within the projection plane PA. When the CPU 20A determines that the content is displayed within the projection plane PA (YES in step S251), the routine proceeds to step S252. On the other hand, when the CPU 20A determines that the content is not displayed within the projection plane PA (NO in step S251), the routine proceeds to step S255.

In step S252, the CPU 20A determines whether the display position of the content is at a predetermined distance or less from the vehicle 12. When the CPU 20A determines that the display position of the content is at the predetermined distance or less from the vehicle 12 (YES in step S252), the routine proceeds to step S253. On the other hand, when the CPU 20A determines that the display position of the content is not at the predetermined distance or less from the vehicle 12, that is, the display position of the content is at more than the predetermined distance (NO in step S252), the routine proceeds to step S255.

In step S253, the CPU 20A determines whether there is an object to be followed by the content. When the CPU 20A determines that there is an object to be followed by the content (YES in step S253), the routine proceeds to step S254. On the other hand, when the CPU 20A determines that there is no object to be followed by the content (NO in step S253), the routine proceeds to step S256.

In step S254, the CPU 20A selects to display the content on the heads-up display 24. The routine then proceeds to step S258.

In step S255, the CPU 20A determines whether there is an object to be followed by the content. This step 255 is similar to step S253. When the CPU 20A determines that there is an object to be followed by the content (YES in step S255), the routine proceeds to step S257. On the other hand, when the CPU 20A determines that there is no object to be followed by the content (NO in step S255), the routine proceeds to step S256.

In step S256, the CPU 20A selects to display the content on the smart contact lens 14. The routine then proceeds to step S258.

In step S257, the CPU 20A selects to display the content on the smart glasses 18. The routine then proceeds to step S258.

In step S258, the CPU 20A determines whether there is no other content to be selected. When the CPU 20A determines that there is no other content to be selected (NO in step S258), the CPU 20A ends the selection process. On the other hand, when the CPU 20A determines that there is other content to be selected (YES in step S258), the routine returns to step S250.

The second embodiment also has effects similar to those of the first embodiment. In particular, by displaying the content to the occupant using the three types of display unit DS, the head-up display 24, the smart contact lens 14, and the smart glasses 18, optimal display can be provided to the user using the strengths of each display unit DS. Specifically, by using the smart glasses 18, the display area is less likely to be limited as compared to the head-up display 24, and higher accuracy of the display position is provided as compared to the smart contact lens 14.

Notes

The bounding box C1, the line C2, the arrow C3 and the warning indication C4 respectively may be displayed on any one of the head-up display 24, the smart contact lens 14 or the smart glasses 18. The various processes executed by the CPU 20A reading software (program) in the above embodiments may be executed by various processors other than the CPU. Examples of the processor in this case include a programmable logic device (PLD) whose circuit configuration can be changed after manufacture, such as field-programmable gate array (FPGA), and a dedicated electric circuit that is a processor including a circuit configuration designed exclusively to perform a specific process, such as application-specific integrated circuit (ASIC). The above processes may be performed by one of the various processors, or may be performed by a combination of two or more processors of the same type or different types (e.g. a plurality of FPGAs or a combination of a CPU and an FPGA). The hardware structure of the various processors is more specifically an electric circuit in which circuit elements such as semiconductor devices are combined.

In the above embodiments, each program is stored (installed) in advance in a non-transitory recording medium that is readable by a computer. For example, the processing program 100 in the display control device 20 is stored in advance in the ROM 20B. However, the present disclosure is not limited to this form, and each program may be provided in a form recorded on a non-transitory recording medium such as compact disc read-only memory (CD-ROM), digital versatile disc read-only memory (DVD-ROM), and Universal Serial Bus (USB) memory. The programs may be downloaded from an external device via a network.

The processing flow described in the above embodiments are also by way of example, and unnecessary steps may be omitted, new steps may be added, or the order of the steps may be changed without departing from the spirit and scope of the present disclosure.

What is claimed is:

1. A display control device, comprising:
a processor configured to:
determine virtual content to be superimposed and displayed over an object on a first display unit fixed to a moving body or a second display unit worn on a human body, the object being a real image seen through the first display unit or the second display unit;
select either the first display unit or the second display unit to display the virtual content based on a predetermined condition; and
superimpose and display the virtual content over the object on the first display unit or the second display unit, the first display unit or the second display unit being selected to display the virtual content,
wherein
the processor is configured to
set a display position of the virtual content that is to be superimposed and displayed over the object, and
select either the first display unit or the second display unit to display the virtual content based on a determination whether a distance between the display position of the virtual content and the moving body is equal to or less than a predetermined distance,
the first display unit has a first viewing angle, and
the second display unit has a second viewing angle greater than the first viewing angle.

2. The display control device according to claim 1, wherein the processor is configured to display the virtual content on the second display unit in response to determining the display position of the virtual content being located outside a display area of the first display unit.

3. A display system, comprising:
the display control device according to claim 1;
a head-up display that is the first display unit mounted on a vehicle that is the moving body; and
a smart contact lens included in the second display unit worn on an eye of an occupant of the vehicle.

4. The display control device according to claim 1, wherein the processor is configured to select either the first display unit or the second display unit to display the virtual content further based on the display position of the virtual content with respect to the first viewing angle of the first display unit and the second viewing angle of the second display unit.

5. The display control device according to claim 4, wherein
the processor is configured to, in response to the display position of the virtual content being located outside the first viewing angle of the first display unit, select the second display unit to display the virtual content.

6. The display control device according to claim 1, wherein the processor is configured to select either the first display unit or the second display unit to display the virtual content based on a further determination whether the object is to be followed by the virtual content when the virtual content is superimposed and displayed over the object.

7. The display control device according to claim 6, wherein
the processor is configured to, in response to determining (i) the distance between the display position of the virtual content and the moving body is equal to or less than the predetermined distance and (ii) the object is to be followed by the virtual content when the virtual content is superimposed and displayed over the object, select the first display unit to superimpose and display the virtual content over the object.

8. The display control device according to claim 7, wherein
the processor is configured to, in response to determining (i) the distance between the display position of the virtual content and the moving body is greater than the predetermined distance and (ii) the object is not to be followed by the virtual content when the virtual content is superimposed and displayed over the object, select the second display unit to superimpose and display the virtual content over the object.

9. The display control device according to claim 8, wherein
the object includes a further vehicle.

10. The display control device according to claim 8, wherein
the object includes a pedestrian.

11. The display control device according to claim 8, wherein
the object includes a road.

12. The display control device according to claim 1, wherein
the first display unit includes a projector, and
the processor is configured to
set a display area projected by the projector, and
display the virtual content on the second display unit in response to determining the display position of the virtual content being located outside the display area of the first display unit.

13. The display control device according to claim 1, wherein
the processor is configured to superimpose and display the virtual content over the object on the first display unit or the second display unit while the object, being the real image, is seen through both the first display unit and the second display unit.

14. A display method, comprising:
a first step of determining virtual content to be superimposed and displayed over an object on a first display unit fixed to a moving body or a second display unit worn on a human body, the object being a real image seen through the first display unit or the second display unit;
a second step of selecting either the first display unit or the second display unit to display the virtual content based on a predetermined condition; and
a third step of superimposing and displaying the virtual content over the object on the first display unit or the second display unit, the first display unit or the second display unit being selected to display the virtual content,
wherein
the first step, the second step and the third step are performed by a computer,
the display method further comprises:
setting a display position of the virtual content that is to be superimposed and displayed over the object, and
selecting either the first display unit or the second display unit to display the virtual content based on a determination whether a distance between the display position of the virtual content and the moving body is equal to or less than a predetermined distance,
the first display unit has a first viewing angle, and
the second display unit has a second viewing angle greater than the first viewing angle.

15. A non-transitory storage medium storing instructions for causing one or more processors to perform a display method comprising:
determining virtual content to be superimposed and displayed over an object on a first display unit fixed to a moving body or a second display unit worn on a human body, the object being a real image seen through the first display unit or the second display unit;
selecting either the first display unit or the second display unit to display the virtual content based on a predetermined condition; and
superimposing and displaying the virtual content over the object on the first display unit or the second display unit, the first display unit or the second display unit being selected to display the virtual content,
wherein
the display method further comprises:
setting a display position of the virtual content that is to be superimposed and displayed over the object, and
selecting either the first display unit or the second display unit to display the virtual content based on a determination whether a distance between the display position of the virtual content and the moving body is equal to or less than a predetermined distance,
the first display unit has a first viewing angle, and
the second display unit has a second viewing angle greater than the first viewing angle.

* * * * *